(12) United States Patent
Guadayol Roig

(10) Patent No.: US 8,957,537 B2
(45) Date of Patent: Feb. 17, 2015

(54) METHOD OF OPERATING A VARIABLE SPEED WIND TURBINE

(71) Applicant: Alstom Renovables España, S.L., Barcelona (ES)

(72) Inventor: Marc Guadayol Roig, Terrassa (ES)

(73) Assignee: Alstom Renovables España, S.L., Barcelona (ES)

( * ) Notice: Subject to any disclaimer, the term of this patent is extended or adjusted under 35 U.S.C. 154(b) by 0 days.

(21) Appl. No.: 14/020,756

(22) Filed: Sep. 6, 2013

(65) Prior Publication Data

US 2014/0097618 A1   Apr. 10, 2014

Related U.S. Application Data

(60) Provisional application No. 61/735,496, filed on Dec. 10, 2012.

(30) Foreign Application Priority Data

Oct. 9, 2012   (EP) .................................... 12382389

(51) Int. Cl.
*F03D 7/02* (2006.01)
*F03D 7/00* (2006.01)

(52) U.S. Cl.
CPC   *F03D 7/00* (2013.01); *F03D 7/022* (2013.01); *F03D 7/0224* (2013.01);
(Continued)

(58) Field of Classification Search
CPC .......................................................... F03D 7/04
USPC ......................................................... 290/44
See application file for complete search history.

(56) References Cited

U.S. PATENT DOCUMENTS 5,155,375 A    10/1992   Holley
7,281,891 B2 *  10/2007   Smith et al. .................... 415/4.3
(Continued)

FOREIGN PATENT DOCUMENTS

EP    2 292 928    3/2011

OTHER PUBLICATIONS

European Search Report for EP 12382389, mailed Apr. 10, 2013, 5 pgs.
(Continued)

*Primary Examiner* — Joseph Waks
(74) *Attorney, Agent, or Firm* — Squire Patton Boggs (US) LLP

(57) ABSTRACT

A method of operating a wind turbine having a rotor with a plurality of blades, and one or more pitch mechanisms for rotating the blades including a sub-nominal zone of operation and a supra-nominal zone of operation for wind speeds above the nominal wind speed wherein the sub-nominal zone of operation includes a first, a second and a third operational range. The first operational range extends from a cut-in wind speed to a first wind speed, wherein the rotor speed is kept substantially constant at a first value. The second operational range extends from the first wind speed to a second wind speed, wherein both the rotor speed and generator torque are varied as a function of wind speed. The third operational range extends from the second wind speed to the nominal wind speed, wherein the rotor speed is kept substantially constant at a second value, and wherein in the second operational range, the generator torque, T, is determined in accordance with $T = k \cdot \omega^2$, wherein $\omega$ is the generator speed and k is non-constant over the second operational range.

15 Claims, 3 Drawing Sheets

(52) U.S. Cl.
CPC ...... *F03D 7/0276* (2013.01); *F05B 2270/1016* (2013.01); *F05B 2270/32* (2013.01); *F05B 2270/321* (2013.01); *Y02E 10/723* (2013.01)
USPC .......................................................... 290/44

(56) References Cited

U.S. PATENT DOCUMENTS

| | | | |
|---|---|---|---|
| 2007/0194574 A1* | 8/2007 | Kabatzke et al. ............... | 290/44 |
| 2011/0049885 A1* | 3/2011 | Hernandez Mascarell ..... | 290/44 |
| 2011/0175352 A1* | 7/2011 | Quottrup ........................ | 290/44 |
| 2012/0205913 A1* | 8/2012 | Garcia Andujar et al. ...... | 290/44 |
| 2014/0070538 A1* | 3/2014 | Bowyer et al. .................. | 290/44 |
| 2014/0186177 A1* | 7/2014 | Bohme et al. .................... | 416/1 |
| 2014/0217742 A1* | 8/2014 | Caruso et al. ................... | 290/55 |

OTHER PUBLICATIONS

Zamani et al., "Modifying power curve of Variable Speed Wind Turbines by Performance Evaluation of Pitch-Angle and Rotor Speed Controllers", IEEE Canada El. Power Conference, pp. 347-352 (2007).

* cited by examiner

METHOD OF OPERATING A VARIABLE SPEED WIND TURBINE

This application claims the benefit of European Patent Application EP12382389.0 filed on Oct. 9, 2012 and U.S. Provisional Patent Application Ser. No. 61/735,496 filed Dec. 10, 2012, the disclosures of which are hereby incorporated by reference in their entirety for all purposes.

The present disclosure relates to a method of operating a wind turbine, in particular a variable speed wind turbine.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A variable wind speed turbine may typically be controlled by varying the generator torque and the pitch angle of the blades. As a result, aerodynamic torque, rotor speed and electrical power will vary.

A common prior art control strategy of a variable speed wind turbine is described with reference to FIG. 1. In FIG. 1, the operation of a typical variable speed wind turbine is illustrated in terms of the pitch angle (β), the electrical power generated (P), the generator torque (M) and the rotational velocity of the rotor (ω), as a function of the wind speed.

In a first operational range, from the cut-in wind speed to a first wind speed (e.g. approximately 5 or 6 m/s), the rotor is controlled to rotate at a substantially constant speed that is just high enough to be able to accurately control it. The cut-in wind speed may be e.g. 3 m/s.

In a second operational range, from the first wind speed (e.g. approximately 5 or 6 m/s) to a second wind speed (e.g. approximately 8.5 m/s), the objective is generally to maximize power output by maintaining the pitch angle of the blades constant so as to capture maximum energy. The generator torque and rotor speed are varied so as keep the tip speed ratio (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:

$$T = K \cdot \omega^2, \text{ wherein}$$

k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, The rotor speed is kept constant, and the generator torque is varied to such effect. This may correspond to a wind speed range of e.g. approximately 8.5 m/s to approximately 11 m/s.

In a fourth operational range, above the nominal wind speed to the cut-out wind speed (for example from approximately 11 m/s to 25 m/s), the blades are rotated ("pitched") to maintain the aerodynamic torque delivered by the rotor substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position" at wind speeds equal to or below nominal wind speed. Said default pitch position may generally be close to a 0° pitch angle. The exact pitch angle in "below rated" conditions depends however on the complete design of the wind turbine.

The before described operation may be translated into a so-called power curve, such as the one shown in FIG. 1. Such a power curve may reflect the optimum operation of the wind turbine under steady-state conditions. However, in non-steady state (transient) conditions, the operation may not necessarily be optimum.

Non steady-state conditions may be caused e.g. by turbulence of the wind, wind shear, yaw misalignment, tower shadow, changes in air density (temperature). A wind turbine may generally not be able to continuously adapt for these transient conditions, because of the large rotor inertia and because continuously adapting the operation would cause high mechanical loads, particularly in the drive train.

In examples of the present invention, an improved method of operation is provided.

SUMMARY

According to a first aspect, a method of operating a variable speed wind turbine as a function of a wind speed is provided. The wind turbine has a rotor with a plurality of blades, and one or more pitch mechanisms for rotating the blades. The method comprises a sub-nominal zone of operation for wind speeds below the nominal wind speed and a supra-nominal zone of operation for wind speeds above the nominal wind speed, wherein the sub-nominal zone of operation comprises a first operational range, a second operational range and a third operational range. The first operational range extends from a cut-in wind speed to a first wind speed, and in this operational range the rotor speed is kept substantially constant at a first value. The second operational range extends from the first wind speed to a second wind speed, both the rotor speed and generator torque are varied as a function of wind speed in this second operational range. The third operational range extends from the second wind speed to the nominal wind speed, and the rotor speed is kept substantially constant in this third operational range. In accordance with a first aspect of the invention, in the second operational range, the generator torque, T, is determined in accordance with $T = k \cdot \omega^2$, wherein w is the rotor speed and k is non-constant over the second operational range.

"k" may be a function of wind shear, and/or wind veer and/or wind turbulence. In some examples, when k is made dependent on the wind turbulence, k may be a function of the standard deviation of the wind speed.

Compared to prior art methods, wherein k is kept constant in order to maximize the power coefficient along the second operational range, in this aspect of the present invention, the operation of the wind turbine may be adapted for non steady-state conditions. For example, in case of significant wind shear (i.e. a significant variation of wind speed with height), it may be that more electrical power can be generated by modifying the rotor speed: a higher rotor speed may e.g. lead to a better aerodynamic performance for the rotor blades at heights greater than the nacelle (they may be closer to the ideal tip speed ratio along the top portion or sector of the rotor swept area). Even though the performance of the blades when they are below the nacelle may be worse, this can be compensated by the increased performance at greater heights. Also, the pitch angle, which is normally zero within this operational range, may be changed to achieve a similar effect: the default aerodynamic profile may be changed. This alternative profile may perform better along a certain sector/portion of the rotor swept area and even though it may perform worse along another sector, the overall performance may be improved.

Similarly for turbulent winds, in case of large variations in wind speed around a mean, it is possible that with a different rotational speed and/or a different pitch angle, more power can be generated. In this sense, a different pitch angle may mean that the default "below rated pitch position" is changed. The pitch angle is not necessarily varied over the second operational range as a function of the wind speed. Rather, the pitch angle is changed as a function of e.g. the standard deviation of the wind speed.

Also in the case of wind veer, the phenomenon of varying wind direction with height may lead to suboptimum results based on a fixed power curve to steady state conditions. By changing the rotor speed, the tip speed ratio may be adjusted to a sector of the rotor area along which the wind is more aligned with the blades. As such, along this portion, more torque may be generated. Loss of torque along other portions of the rotation may be more than compensated.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
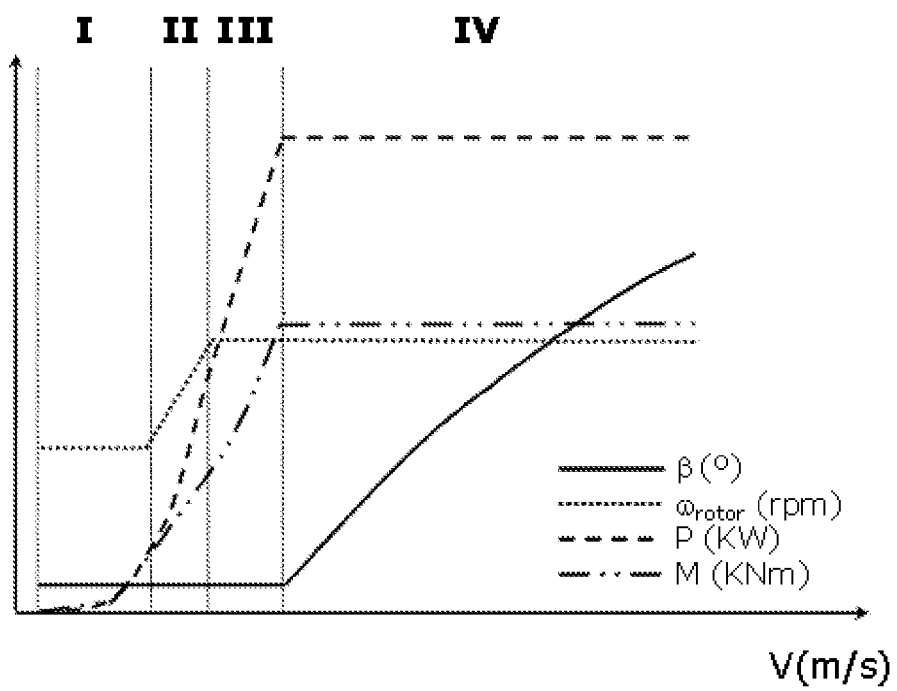
FIG. 1 illustrates a typical power curve of a wind turbine.

FIG. 1 illustrates a prior art control method and shows respectively the pitch angle ($\beta$), rotor speed ($\omega_{rotor}$), electrical power (P) and aerodynamic torque (M) at varying wind speeds.

As previously described, the pitch angle is generally not changed until nominal wind speed is reached, e.g. at 11 m/s. At a slightly lower wind speed, e.g. around 8.5 m/s, nominal rotor speed may be reached. At wind speeds above nominal wind speed, the pitch angle may be varied such as to maintain the aerodynamic torque substantially constant. The rotor speed, generator torque and electrical power generated may also be maintained substantially constant. This may be maintained from nominal wind speed to cut-out wind speed.

Figure 2:
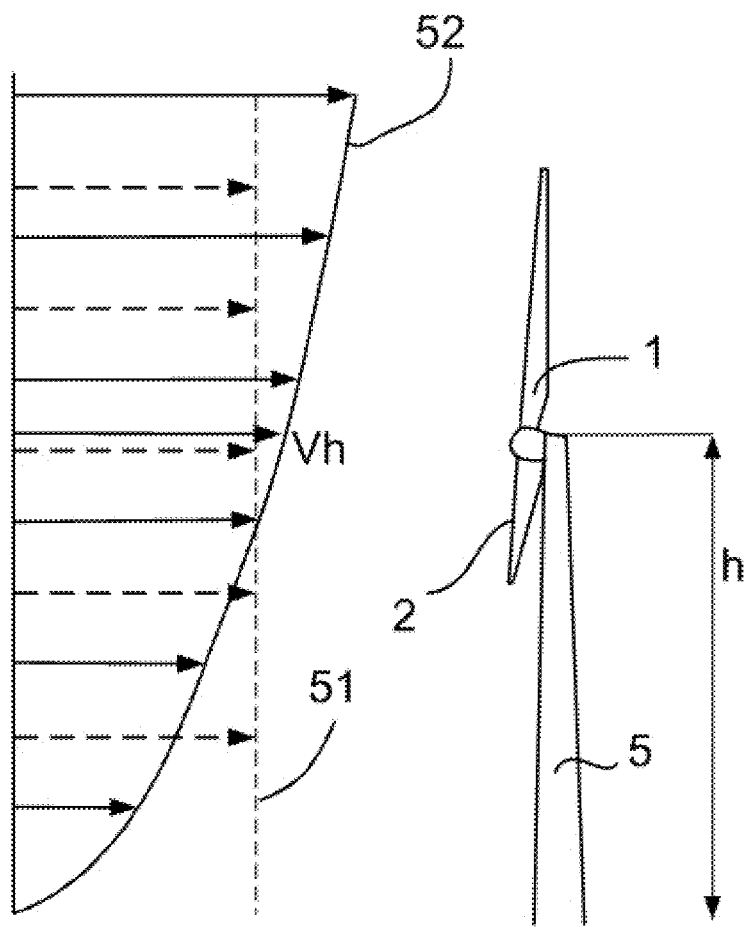
FIG. 2 illustrates the phenomenon of wind shear.

FIG. 2 illustrates the phenomenon of wind shear. A wind turbine comprising a tower 5 carrying a rotor with blades 1, 2 and a third non-visible blade is illustrated. The tower 5 has height h. At height h, the wind speed is Vh. This wind speed may be measured e.g. by an anemometer based on the nacelle.

This however does not mean that the wind speed is constant over the entire rotor swept area. The wind speed may vary in accordance with wind profile 52. In particular, at increased heights, the wind speed may be higher, such as indicated in FIG. 2, and the wind speed may be lower at heights below the nacelle. The resulting wind speed, i.e. the wind speed representative for the wind energy as perceived by the whole of the rotor may be e.g. the wind speed indicated by reference sign 51.

The control systems of a wind turbine may thus (directly or indirectly) perceive a certain wind speed, e.g. 51, and base its control signals on said value. That is, rotor pitch and rotor speed are determined in accordance with wind speed 51. In circumstances, it is possible that by changing the rotor speed, the wind turbine is able to generate more power, because the blades generate more torque when they are above the nacelle. A loss of aerodynamic torque along the sector of the rotor swept area when the blades are below the nacelle may be less, so that as a result more electrical power may be generated.

In some embodiments, k as a function of the wind shear may be stored in a look-up table, or in the form of a mathematical expression. As a measure for the wind shear, the difference between the minimum velocity and the maximum velocity within the rotor swept area may be used, either as an absolute value or as a percentage. The percentage may be a percentage of the maximum velocity, the minimum velocity or a mean value.

Alternatively, the difference between the maximum velocity and the velocity at the height of the nacelle may be used, either as an absolute value or as a percentage.

The look-up table (or mathematical expression) may be determined by off-line experimentation and/or simulations. Through simulations, the dependency of a certain wind turbine (i.e. of a specific type, in a specific location) or wind turbine type (regardless of the location) may be determined. From these simulations, a lookup-table for k, as a function of the wind shear may be extracted.

Optionally, the look-up table may be further refined through experiments. In such an experimental phase, the wind shear at a given moment may be measured using e.g. a LIDAR system and/or through blade load measurements. The measurements do not need to be very frequent (e.g. every few minutes) because the phenomenon of wind shear generally only varies slowly.

In an example, during operation, the wind shear may be measured or estimated using a LIDAR. Along the second operational range, the wind turbine controller computes a torque demand that is sent to the power converter. Such a computed torque is a function of the measured generator speed and the measured wind shear.

Alternatively, instead of through simulations and/or experiments (i.e. testing), the value of k, as a function of wind shear may be determined during operation through a self-learning algorithm implemented in the wind turbine. For example, through a process of trial and error, the wind turbine control system looks for the optimum generator torque as a function of generator speed and measured wind shear.

Alternatively, or in addition, the pitch angle may be varied from its predetermined value. In the second operational range, the pitch angle is normally maintained at a default pitch angle for below rated wind conditions. This value may be zero or close to zero. By changing the pitch angle, the same effect as before may be obtained. A possible loss of power for the blades along a sector of the rotor swept area, may be more then compensated by a gain of power for the blades along another sector.

In the case of turbulence, a similar effect may be obtained. With large variations of wind speed, the maximum wind speed will be much higher than the minimum wind speed. It is possible that by adapting the rotor speed and/or pitch angle to a higher or lower wind speed than the average wind speed, an increase of electrical power may be obtained. This may thus lead to a control of e.g. the rotor torque in the second operational range to be determined by $T = K \cdot \omega^2$, wherein K is a function of the standard deviation of the wind speed (rather than a constant value as in prior art control methods), and ω is the rotational speed of the rotor.

In an example, k may be in the form of a look-up table or a mathematical expression as a function of e.g the standard deviation of the wind speed. In some implementations, the average wind speed during e.g. a minute may be used. A standard deviation of the wind speed, as an indication of turbulence, may then be determined based on these one-minute averages.

Figure 3:
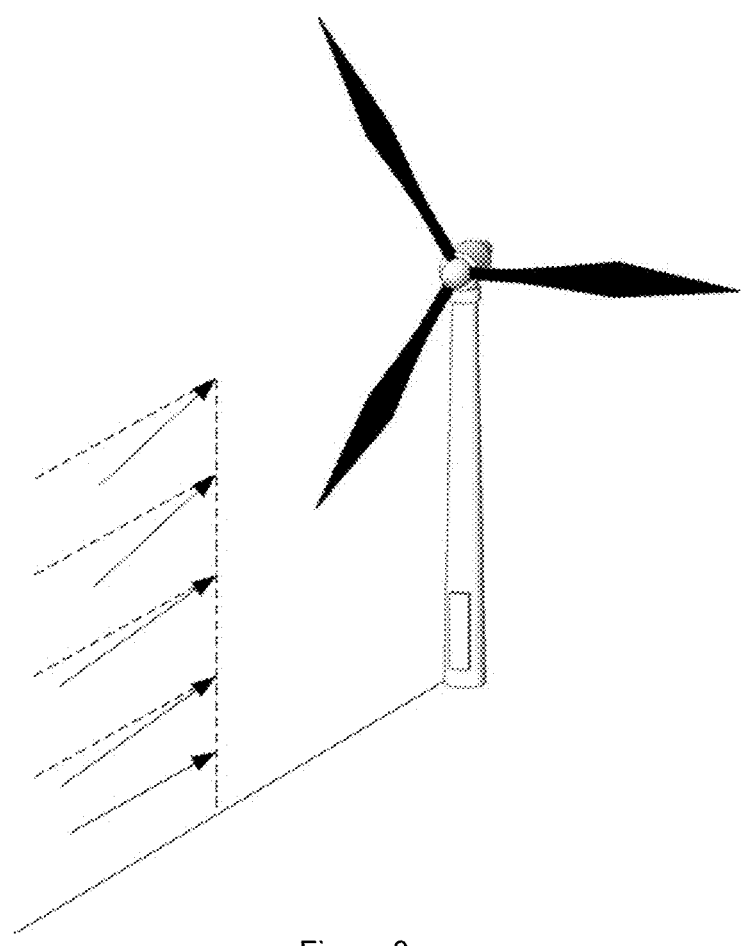
FIG. 3 illustrates the phenomenon of wind veer.

In a case of wind veer, as illustrated in FIG. 3, the wind direction changes with height. The yaw system of the wind turbine may be used to search for an optimal position, but clearly it is not possible to align the wind turbine with all wind directions simultaneously. During operation, the rotor speed may be based on the resulting aerodynamic torque that is received by the rotor. Due to the wind veer, in certain positions of the blades, they may be more aligned with the wind direction than in others. By changing the rotor speed, the tip speed ratio may be adjusted to a portion of the rotation along which the wind is more aligned with the blades. As such, along this portion, more torque may be generated. Loss of torque along other portions of the rotation may be more than compensated.

The amount of wind veer may be expressed e.g. as a number of degrees of difference of orientation ("angle") between wind directions. In embodiments, the maximum deviation from the mean wind direction (which supposedly will be aligned substantially with the rotor shaft) may be used. In other embodiments, the maximum deviation between one direction and another found along the rotor swept area may be used.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a variable speed wind turbine as a function of a wind speed, the wind turbine having a rotor with a plurality of blades, and one or more pitch mechanisms for rotating the blades, and the method comprising a sub-nominal zone of operation for wind speeds below a nominal wind speed and a supra-nominal zone of operation for wind speeds above the nominal wind speed, wherein the sub-nominal zone of operation comprises a first operational range, a second operational range and a third operational range, wherein the first operational range extends from a cut-in wind speed to a first wind speed, and a rotor speed is kept substantially constant at a first value in the first operational range, the second operational range extends from the first wind speed to a second wind speed, and both the rotor speed and a generator torque are varied as a function of wind speed in the second operational range, the third operational range extends from the second wind speed to the nominal wind speed, and the rotor speed is kept substantially constant at a second value in the third operational range, and wherein in the second operational range, the generator torque, T, is determined in accordance with $T=k\cdot\omega^2$, wherein ω is the generator speed and k is non-constant over the second operational range.

2. The method of claim 1, wherein k is a function of wind shear.

3. The method of claim 2, wherein the wind shear is measured using a LIDAR.

4. The method of claim 2, wherein the wind shear is determined from measurements of loads on the blades.

5. The method of claim 2, wherein the wind shear is determined from variations in generator speed.

6. The method of claim 1, wherein k is a function of wind turbulence.

7. The method of claim 6, wherein k is a function of a standard deviation of the wind speed.

8. The method of claim 1, wherein k is a function of wind veer.

9. The method of claim 8, wherein the wind veer is measured using a LIDAR.

10. The method of claim 1, wherein in the second operational range a pitch angle of the blades is varied as a function of wind shear.

11. The method according to claim 10, wherein in the second operational range the pitch angle is not varied as a function of wind speed.

12. The method of claim 11, wherein the wind speed is measured by an anemometer based on a nacelle of the wind turbine.

13. The method of claim 1, wherein in the second operational range a pitch angle of the blades is varied as a function of wind turbulence.

14. A wind turbine having
a rotor with a plurality of blades,
one or more pitch mechanisms for rotating the blades around their longitudinal axes,
a generator, and
a control system adapted to control a torque of the generator and to control the pitch mechanisms, wherein
the control system is further adapted to carry out the method of claim 1.

15. The wind turbine of claim 14, further comprising a LIDAR.

* * * * *